Patented May 2, 1939

2,156,727

UNITED STATES PATENT OFFICE 2,156,727

BLUE PIGMENT COLORS AND A PROCESS OF PREPARING THEM

Erich Korinth, Frankfort-on-the-Main-Hochst, and Georg Meder, Munster, Germany, assignors to I. G. Farbenindustrie Aktiengesellschaft, Frankfort-on-the-Main, Germany No Drawing. Application August 31, 1934, Serial No. 742,346. In Germany September 13, 1933

7 Claims. (Cl. 134—58)

The present invention relates to blue pigment colors prepared from barium sulfate and to a process of preparing them.

We have found that a new kind of stable blue pigment colors can be prepared in an economical manner from barium sulfate with the aid of manganese compounds. These pigment colors fulfil the highest requirements.

The characteristic feature of the new process consists in heating barium sulfate together with manganese compounds so as to obtain a thermic reaction, under such conditions as lead to the production of the $MnO_4$ group or counteract its decomposition. This can be attained, in a manner in itself known, by carrying out the heating process in the presence of basic substances and not too high a temperature. The temperature which is most suitable is between about 400° C. and about 850° C. Furthermore it is advisable for the maintenance or the formation of the $MnO_4$ group to carry out the heating process either with access of air or oxygen or in the presence of a substance having an oxidizing action, such as a nitrate.

As basic substances, there may advantageously be used particularly basic barium compounds, such as barium carbonate, barium hydroxide or barium oxide. An addition of basic substances may, however, also be dispensed with, if compounds are present which, by the action of the high temperatures, produce a basic compound, for instance barium nitrate. The manganates and permanganates of the alkali metals and alkaline earth metals likewise produce alkaline substances during the heating process. Consequently, they can be caused to react with the barium sulfate without any further addition; during this process they simultaneously act as compounds providing manganese and alkali.

As to the quantitative proportions, it is suitable, for instance if potassium manganate or potassium permanganate are used, to add up to 15 per cent. of these compounds to the barium sulfate before the heating process. In all cases it is advisable to mix as intimately as possible the barium sulfate and the manganese compound used, so that the latter is homogeneously distributed in a particularly fine state in the total quantity of barium sulfate.

The process may be carried out for instance as follows: The barium sulfate is precipitated in the presence of the manganese compounds, for instance manganese nitrate, $KMnO_4$, $K_2MnO_4$, $BaMnO_4$, or the like. It is sufficient for this purpose to cause sulfuric acid or a solution of a sulfate to run into an aqueous suspension of barium carbonate which simultaneously contains the salts of manganese in a dissolved condition. The precipitate then contains a sufficient quantity of manganese compounds, so that in the subsequent heating process the desired blue color may be obtained. It is particularly advantageous furthermore to add a substance having a basic action, for instance barium carbonate and to carry out the process in an oxidizing melt; the blue pigment thus produced has a particularly deep color.

The barium sulfate may also be produced only during the heating process, for instance from barium carbonate or barium nitrate and sodium sulfate. It is likewise possible to start from the finished, precipitated barium sulfate.

It may be particularly advantageous to start with the cheap heavy spar if it is finely ground. In this case it suffices for instance to mix the heavy spar powder with a solution of the desired manganese compounds, to add a small quantity of basic substance and oxidizing flux (preferably barium carbonate and barium nitrate) and to heat the mixture to incandescence for about half an hour to one hour, for instance at about 700° C.

If the manganese compound has not been completely bound to the barium sulfate, green to brown colors first appear which can readily be removed by an after-treatment with an acidified solution of a bisulfite of an alkali or alkaline earth metal or with sulfurous acid. The previously covered blue coloration then appears in a complete purity.

In many cases it is sufficient to carry out the purification by the addition of dilute nitric acid to the finished fused mass without adding a particular reducing agent. As soon as the purification is complete, the acid and the manganese which has been dissolved, are removed by decanting. It has been found to be advantageous not to use water for the decanting process, but a salt solution by which the solubility of the barium sulfate is repressed, that is a solution of sulfate salt or preferably barium salt, for instance barium nitrate. There is thus prevented a too far-reaching attack; the velocity at which the dispersed particles deposit at the bottom is simultaneously increased. If the acid has been removed in this manner, the product can be further treated by washing and drying operations. It is advisable however, to add a small quantity of barium carbonate to the product in order to create a buffer against later actions of stronger acids.

The barium carbonate may be added subsequently or it may be precipitated upon the deposited pigment. The addition of barium carbonate acts by its neutralising effect and by the reduction of the solubility of the barium sulfate owing to the formation of barium bicarbonate by the action of acid.

The color pigments prepared according to the described process appear to be crystals of barium sulfate, in the lattice construction of which barium manganate is embedded. The color pigments are completely fast to light, insoluble and resistant to atmospheric conditions. They are distinguished by the excellent purity of their color and a small content of black and moreover by the known good pigmentary properties of the barium sulfate. The following examples serve to illustrate the invention, but they are not intended to limit it thereto:

(1) 5 kilos of potassium manganate or potassium permanganate and 25 kilos of barium nitrate are together dissolved in 500 liters of water. The solution is precipitated at boiling temperature, while vigorously stirring, with a solution of 12 kilos of calcined sodium sulfate in 50 liters of water.

The violet or violet-red precipitation product is heated for about 15 minutes at a temperature between 750° C. and 800° C., while being exposed to the air.

The mixed crystal obtained by way of precipitation is destroyed with separation of manganese by gently heating it. Later, there is formed in its place a body of a pale blue coloration. In order to obtain the pigment in a pure color, that is free from any excess of manganese-oxide or barium manganate, it may be necessary to subject the heated product which has been comminuted to small pieces by chilling or grinding, to a purification, for instance with hydrochloric acid and a solution of a bisulfite of an alkali or an akaline earth metal.

(2) A solution of 1.3 kilos of barium nitrate and 100 grams of manganese nitrate containing 6 molecules of water of crystallization in 10 liters of water is precipitated at boiling temperature by means of a solution of 1.3 kilos of calcined sodium sulfate in 5 liters of water. The precipitate obtained is further treated as described in Example 1. In this case also there is obtained an azure pigment.

(3) An intimate mixture of 900 grams of barium sulfate (precipitated and of a pure white color), 250 grams of barium nitrate, 50 grams of potassium permanganate or potassium manganate and 150 grams of barium hydroxide is slightly moistened and heated for about one hour at about 720° C. in the presence of oxygen. The sintered cake obtained is then reduced to small pieces (for instance by chilling it) and the pigment is purified with dilute hydrochloric acid and a solution of a bisulfite of an alkali or alkaline earth metal. There is obtained a dark azure pigment.

(4) An intimate mixture of 900 grams of heavy spar (finely ground and of a pure white color), 250 grams of barium nitrate and 62 grams of barium carbonate is covered with a hot solution of 30 grams of barium permanganate, and the whole is intimately mixed and then heated for about 1 hour at about 690° C. in the presence of oxygen. The further treatment is carried out as described in Example 3.

(5) An intimate mixture of 710 grams of calcined sodium sulfate, 1.3 kilos of barium nitrate, 50 grams of potassium permanganate and 150 grams of barium hydroxide is fused for about 2 hours at 500° C. The fused mass obtained is further treated as described in Example 3. There is obtained a light-blue pigment.

(6) 280 grams of sodium sulfate containing water of crystallization, 50 grams of caustic soda, 25 grams of calcined sodium carbonate and 65 grams of potassium manganate are dissolved at 35° C. to 40° C. in 1000 grams of water. The solution is filtered and caused to run slowly, while vigorously stirring, into a boiling solution of 700 grams of barium nitrate and 25 grams of caustic soda and 2000 grams of water. The violet precipitate obtained is filtered by suction and intimately kneaded, without previously washing it, with 100 grams of finely pulverized barium nitrate. The mass is then dried and the dried cake which has been reduced to small pieces is heated for about 45 minutes at 690° C. in a covered crucible. The product obtained is then treated with 1 liter of water and finely ground. The suspension is mixed, while stirring with nitric acid until an acid reaction is obtained. The nitric acid is caused to act upon the suspension for about 1 hour. The suspension is then decanted with a saturated solution of barium nitrate until the acid and the manganese which has been dissolved are removed. A small quantity, for instance ½ per cent. of barium carbonate is precipitated upon the suspended blue pigment and the pigment is then dried after having been thoroughly washed.

We claim:

1. The process of producing blue manganate pigment colors which comprises heating to a temperature of between about 400° C. and about 850° C. an intimate mixture of barium sulfate and a manganese compound in the presence of a basic substance and of air and purifying the product thus obtained with a solution containing sulfurous acid.

2. The process of producing blue manganate pigment colors which comprises heating to a temperature of between about 400° C. and about 850° C. an intimate mixture of barium sulfate and a manganese compound in the presence of a basic substance and an agent having an oxidizing action, and purifying the product thus obtained with a solution containing sulfurous acid.

3. As new products, blue pigment colors consisting of crystals of barium sulfate containing in a particular lattice construction barium manganate, said pigment colors being identical with those produced by the process of claim 4 and being completely fast to light, insoluble and resistant to atmospheric conditions and having an excellent purity of blue color.

4. The process of producing blue manganate pigment colors which comprises heating to a temperature of between about 400° C. and about 850° C. an intimate mixture of barium sulfate and a manganese compound in the presence of a basic substance and of air and purifying the product thus obtained with a solution containing a strong mineral acid and a reducing agent.

5. The process of producing blue manganate pigment colors which comprises heating to a temperature of between about 690° C. and about 720° C. an intimate mixture of finely ground heavy spar and a manganese compound in the presence of a basic substance and of air and purifying the product thus obtained with a solution containing a strong mineral acid and a reducing agent.

6. The process of producing blue manganate pigment colors which comprises heating to a temperature of 720° C. an intimate mixture of precipitated pure white barium sulfate, barium nitrate, potassium permanganate and barium hydroxide in the presence of oxygen and purifying the product thus obtained with dilute hydrochloric acid and bisulfite solution.

7. In the process of producing pigment colors by heating an intimate mixture of barium sulfate and a manganese compound under oxidizing conditions the steps which comprise adding to the starting mixture a substance yielding a basic compound when heated, heating the resulting mixture to a temperature of between about 400° C. and about 850° C., cooling the mixture and purifying it with a solution containing sulfurous acid.

ERICH KORINTH.
GEORG MEDER.